United States Patent
Hänni et al.

(10) Patent No.: US 10,811,925 B2
(45) Date of Patent: Oct. 20, 2020

(54) PLASTIC-OVERMOLDED STATOR SYSTEM WITH IMPROVED HEAT DISSIPATION HAVING EXPOSED RETURN PATHS AND INJECTED CROSSBARS

(71) Applicant: Lakeview Innovation Ltd., Buochs (CH)

(72) Inventors: Tobias Hänni, Lucerne (CH); Remo Schelling, Alpnach-Dorf (CH); Jürgen Mayer, Sachseln (CH)

(73) Assignee: LAKEVIEW INNOVATION LTD., Buochs (CH)

( * ) Notice: Subject to any disclaimer, the term of this patent is extended or adjusted under 35 U.S.C. 154(b) by 677 days.

(21) Appl. No.: 15/244,789

(22) Filed: Aug. 23, 2016

(65) Prior Publication Data

US 2017/0063190 A1 Mar. 2, 2017

(30) Foreign Application Priority Data

Aug. 26, 2015 (EP) .................................... 15002533

(51) Int. Cl.
*H02K 5/02* (2006.01)
*H02K 5/08* (2006.01)
(Continued)

(52) U.S. Cl.
CPC ................. *H02K 5/02* (2013.01); *H02K 1/12* (2013.01); *H02K 3/47* (2013.01); *H02K 5/04* (2013.01);
(Continued)

(58) Field of Classification Search
CPC .. H02K 5/00; H02K 5/02; H02K 5/08; H02K 5/04; H02K 5/161; H02K 5/225;
(Continued)

(56) References Cited

U.S. PATENT DOCUMENTS 3,688,137 A * 8/1972 Filhol .................... H01B 3/002
310/43
3,780,323 A * 12/1973 Swain .................... H02K 3/325
310/194

(Continued)

FOREIGN PATENT DOCUMENTS

CH        692 437 A5      6/2002
CN     104079098 A      10/2014
(Continued)

OTHER PUBLICATIONS

CN 204145092 English Translation.*
(Continued)

*Primary Examiner* — Maged M Almawri
(74) *Attorney, Agent, or Firm* — Buchanan Ingersoll & Rooney PC

(57) ABSTRACT

The present invention relates to a stator system for an electric motor with an internal rotor. The stator system includes a stator winding and a metal external return path radially enclosing the stator winding. The external return path is surrounded by a retaining structure that holds the stator system together. The retaining structure can be injected to the external return path with plastic in the form of a cage, so that the external return path is not covered by the retaining structure in some regions but is exposed.

16 Claims, 4 Drawing Sheets

Figure 1:
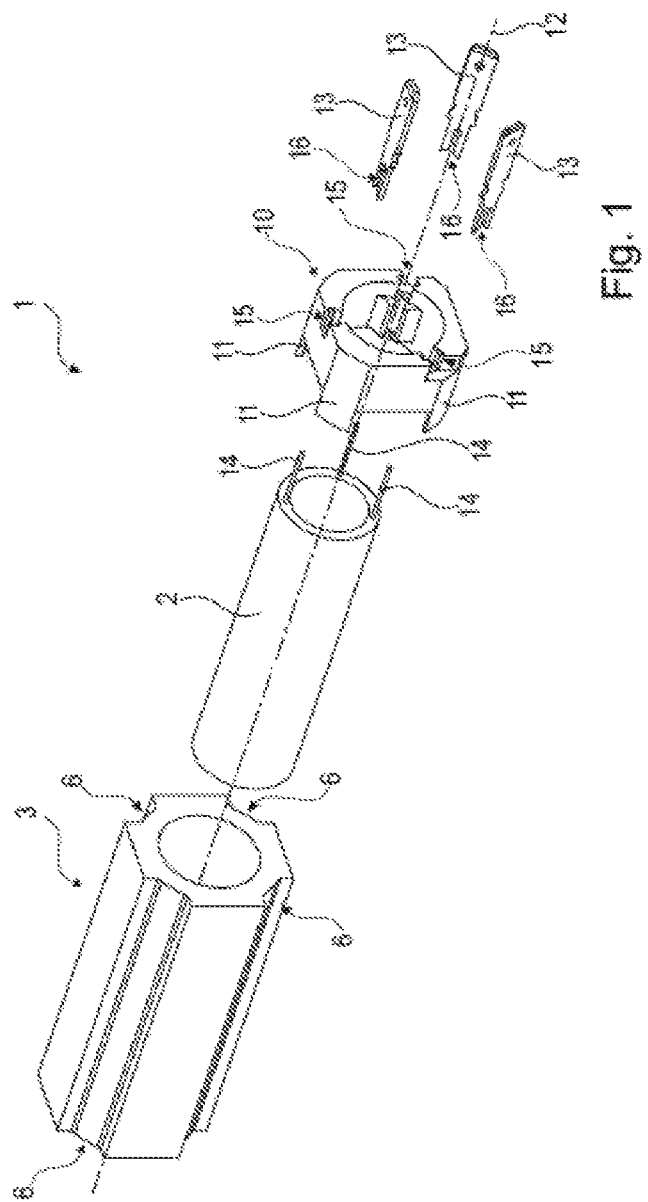

(51) Int. Cl.
  *H02K 5/22* (2006.01)
  *H02K 5/16* (2006.01)
  *H02K 3/47* (2006.01)
  *H02K 1/12* (2006.01)
  *H02K 5/04* (2006.01)
  *H02K 15/02* (2006.01)

(52) U.S. Cl.
  CPC .............. *H02K 5/08* (2013.01); *H02K 5/161* (2013.01); *H02K 5/225* (2013.01); *H02K 15/02* (2013.01)

(58) Field of Classification Search
  CPC ........ H02K 15/02; H02K 15/026; H02K 1/12; H02L 3/47
  USPC ................ 310/45, 43, 89, 216.001, 216.002, 310/216.004, 405, 406, 411, 410, 412, 310/413, 415, 14, 23, 49.29; 29/596
  See application file for complete search history.

(56) References Cited

U.S. PATENT DOCUMENTS

| | | | | | |
|---|---|---|---|---|---|
| 3,827,141 | A | * | 8/1974 | Hallerback | H02K 1/16 29/596 |
| 3,861,026 | A | * | 1/1975 | Swaim | H02K 3/325 242/432.6 |
| 3,866,071 | A | * | 2/1975 | Hallerback | H02K 5/15 310/216.004 |
| 3,963,949 | A | * | 6/1976 | Church | H02K 1/143 310/43 |
| 4,053,800 | A | * | 10/1977 | Hanning | H02K 3/12 310/43 |
| 4,263,711 | A | * | 4/1981 | Sakano | B29C 45/14639 264/272.15 |
| 4,352,897 | A | | 10/1982 | Ogata et al. | |
| 4,546,280 | A | * | 10/1985 | Pfluger | H02K 5/141 310/239 |
| 4,908,534 | A | | 3/1990 | Gubler et al. | |
| 5,268,607 | A | * | 12/1993 | McManus | F16C 35/02 310/89 |
| 5,806,169 | A | * | 9/1998 | Trago | H02K 5/08 264/272.2 |
| 7,071,593 | B2 | * | 7/2006 | Matsushita | H02K 1/145 310/194 |
| 7,814,641 | B2 | * | 10/2010 | Du | H01R 43/10 264/272.2 |
| 7,928,348 | B2 | * | 4/2011 | Neal | B29C 45/1704 219/628 |
| 8,450,898 | B2 | * | 5/2013 | Sears | H02K 3/522 310/194 |
| 8,581,452 | B2 | * | 11/2013 | Roopnarine | H02K 1/02 310/45 |
| 9,287,755 | B2 | | 3/2016 | Woolmer et al. | |
| 9,337,696 | B2 | | 5/2016 | Funakoshi et al. | |
| 9,660,495 | B2 | * | 5/2017 | Brzuska | H02K 3/28 |
| 10,164,507 | B2 | * | 12/2018 | Romero-Beltran | H02K 17/10 |
| 2001/0033742 | A1 | * | 10/2001 | Weaver | H02K 1/28 388/800 |
| 2002/0135263 | A1 | * | 9/2002 | Neal | G11B 19/2009 29/597 |
| 2004/0056537 | A1 | | 3/2004 | Du et al. | |
| 2005/0278937 | A1 | | 12/2005 | Du et al. | |
| 2005/0280321 | A1 | | 12/2005 | Du et al. | |
| 2006/0255678 | A1 | * | 11/2006 | Du | H01R 43/10 310/156.43 |
| 2008/0084131 | A1 | | 4/2008 | Yamawaki et al. | |
| 2009/0015094 | A1 | * | 1/2009 | Yoshitake | H02K 3/34 310/257 |
| 2011/0225806 | A1 | * | 9/2011 | Knight | B23P 11/025 29/596 |
| 2013/0147291 | A1 | | 6/2013 | Woolmer et al. | |
| 2014/0111037 | A1 | | 4/2014 | Funakoshi et al. | |
| 2014/0292115 | A1 | | 10/2014 | Brzuska et al. | |
| 2014/0339929 | A1 | * | 11/2014 | Himmel | H02K 3/44 310/43 |
| 2015/0340914 | A1 | * | 11/2015 | Asakura | H02K 21/16 310/208 |
| 2016/0377082 | A1 | * | 12/2016 | Fecke | H02K 5/128 417/420 |
| 2017/0025912 | A1 | * | 1/2017 | Chuang | H02K 3/28 |
| 2017/0288499 | A1 | * | 10/2017 | Beyerl | H02K 11/21 |

FOREIGN PATENT DOCUMENTS

| | | | | |
|---|---|---|---|---|
| CN | 204145092 | * | 2/2015 | ............. H02K 1/146 |
| CN | 204145092 U | | 2/2015 | |
| EP | 0 254 930 A1 | | 2/1988 | |
| EP | 0254930 A1 | * | 2/1988 | ............... H02K 1/20 |
| EP | 0 344 473 A1 | | 12/1989 | |
| EP | 2 017 944 A1 | | 1/2009 | |
| JP | S 54-70005 U | | 5/1979 | |
| JP | 200573397 A | * | 8/2003 | ............... H02K 3/50 |
| JP | 2007-166760 A | | 6/2007 | |
| JP | 2013-537797 A | | 10/2013 | |
| JP | 2014-087085 A | | 5/2014 | |
| TW | 200607212 A | | 2/2006 | |

OTHER PUBLICATIONS

JP200573397A English Translation.*
Polyphthalamide PPA ASTM D533609 17985, Standard, 2009.*
EP0254930A1 Englisht Translation.*
Office Action (Notice of the First Office Action) dated May 25, 2018, by the Chinese Patent Office in corresponding Chinese Patent Application No. 201610722869.6, and an English Translation of the Office Action. (23 pages).
Extended European Search Report dated Feb. 5, 2016, by the European Patent Office in corresponding European Patent Application No. 15002533.6.
Office Action (Notice of Reasons for Refusal) dated Aug. 4, 2020, by the Japanese Patent Office in corresponding Japanese Patent Application No. 2016-162623, and an English Translation of the Office Action. (10 pages).

* cited by examiner

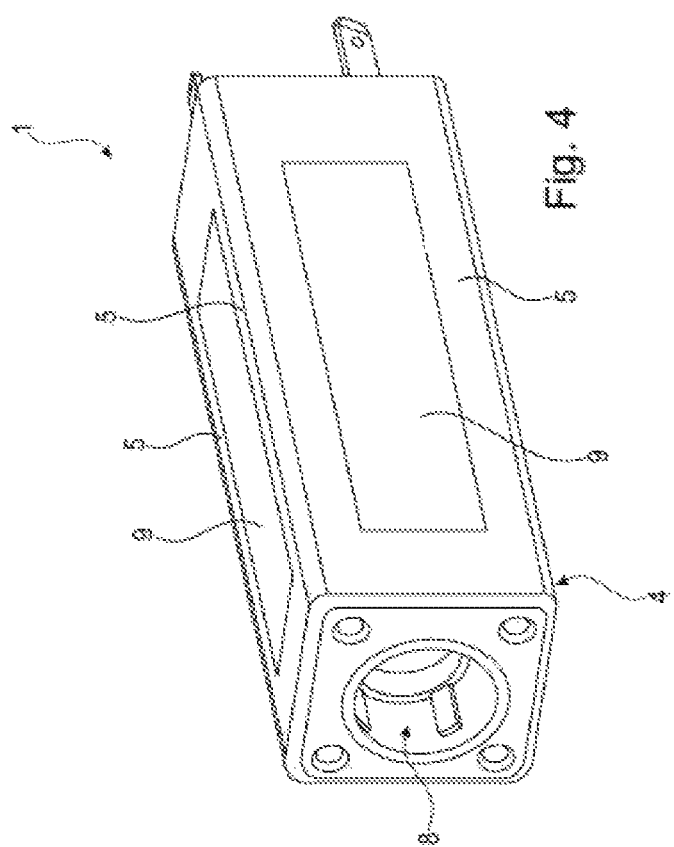

PLASTIC-OVERMOLDED STATOR SYSTEM WITH IMPROVED HEAT DISSIPATION HAVING EXPOSED RETURN PATHS AND INJECTED CROSSBARS

The present invention relates to a stator system for an electric motor with an internal rotor. A generic stator system includes a stator winding and a metal external return path radially enclosing the stator winding. The external return path is surrounded by a retaining structure that holds the stator system together.

Stator systems are known from prior art. Either a housing sleeve is used as the retaining structure which in most cases consists of metal, or the latter is formed by injecting plastic around it that completely encloses the external return path.

A generic stator system is known, for example, from EP2017944A1. The external return path of this stator system consists of a layered stack of sheets, the retaining structure is formed by a thin-walled metal housing sleeve.

By injecting plastic around them, the components of the stator system may be fixed in a particularly simple and inexpensive manner. No additional external housing is required in this case. The plastic overmold itself forms the housing of the electric motor to be formed. Compared to a metal housing sleeve, however, a plastic overmold has a disadvantage in that the plastic has a poorer heat transfer and thus a poorer heat dissipation to the outside. Mainly in case of electric motors that are capable of overload and have an air-core hollow-cylindrical stator winding, this results in the maximum efficiency becoming unnecessarily limited due to the reduced heat transfer. In particular with high-speed small-size motors having a diameter of smaller than or equal to 45 mm, in particular smaller than or equal to 25 mm, improved heat dissipation is therefore desirable.

It is the object of the present invention to provide a generic stator system which can be manufactured particularly easily and inexpensively while ensuring improved heat dissipation to the outside.

Accordingly, in a generic stator system, the object is achieved according to the invention if the retaining structure is injected with plastics to the external return path in the form of a cage, so that the external return path is, in some regions, not covered by the retaining structure but exposed. Therefore, the external return path is partially enclosed by the retaining structure in the form of the plastic cage, where the exposed regions of the external return path ensure optimal heat dissipation to the outside. The invention is in particular suited for stator systems of brushless electric motors. Still preferably, the stator system according to the invention is suited for high-speed small-size motors having a diameter of smaller than or equal to 45 mm, in particular smaller than or equal to 25 mm. The stator system is hollow and preferably has an opening each at the front and the rear ends to be able to receive the internal rotor.

Advantageous embodiments of the present invention are the subject matter of the sub-claims.

In a particularly preferred embodiment of the present invention, the cage has several crossbars extending in the axial direction of the external return path. In this embodiment, this results in a particularly stable cohesion of the stator system. Furthermore, in this embodiment, the plastic overmold may be produced in a particularly simple way. However, it is also possible for the crossbars not to extend axially but skewly with respect to the axis of the stator system, or for the cage to be formed, for example, by a braided grid.

In a particularly preferred embodiment of the present invention, the crossbars are injected into axially extending recesses at the outer periphery of the external return path. The recesses are preferably uniformly distributed across the periphery of the external return path. This embodiment provides a particularly stable and above all compact design.

It is furthermore advantageous for the crossbars of the cage to be fitted in a flush manner in the contour of the outer periphery of the external return path. This results in a smooth outer surface of the stator system or the electric motor, respectively.

In a further particularly preferred embodiment of the present invention, the external return path has a basically rectangular cross-section, the recesses in the form of grooves being located in the corners of the rectangular cross-section. In many applications, this facilitates the installation of the electric motor. In this embodiment, the exposed regions of the external return path are moreover essentially plane and may therefore be placed against an equally plane component with a corresponding heat transfer coefficient to achieve improved heat transfer. A particularly simple construction is provided if the cross-section of the external return path is basically square.

In another preferred embodiment of the present invention, the cage has a bearing receiver for mounting the internal rotor at each of the axial ends of the stator system. The bearing receivers of the rotor may thus be produced in a simple and inexpensive manner in one processing step when the stator system is being overmolded.

In another preferred embodiment of the present invention, the external return path is a soft-magnetic punch-stacked or interlocked stack of sheets. This embodiment, too, contributes to a simple manufacture of the stator system. Moreover, this embodiment ensures good heat transfer from the motor's interior via the external return path to the outside. The stack of sheets is preferably provided with a corrosion-resistant coating both inside and outside.

In another preferred embodiment of the present invention, the exposed regions of the external return path are lacquered, so that, together with the cage, a smooth outer surface of the stator system is formed. If the external return path consists of a stack of sheets, the return path sheets are thereby additionally protected from external influences.

In another preferred embodiment of the present invention, the plastic used for the cage is polyphthalamide. This material may be particularly easily processed and ensures an excellent cohesion of the stator system.

In another preferred embodiment of the present invention, the stator winding is an air-core hollow-cylindrical winding. The stator winding is thus not wound onto teeth of the stator, but is self-supporting. This embodiment results in a particularly simple assembly of the stator system by simply pushing or inserting the air-core hollow-cylindrical winding into the external return path in a first manufacturing step. The stator winding is preferably a three-phase winding. It is pointed out that the stator winding may alternatively also consist of several coils which are wound onto corresponding teeth of the external return path radially facing inwards.

In another preferred embodiment of the present invention, the stator system furthermore comprises a winding support for mounting the stator winding, wherein the winding support is arranged at an axial end of the external return path and comprises several projections which are inserted into the axially extending recesses at the outer periphery of the external return path, and wherein the cage surrounds the unit consisting of the external return path and the winding support. This embodiment, too, facilitates the assembly of the stator system according to the invention. The winding support may be easily placed onto the external return path after the stator winding has been inserted into the external return path. The final fixing of the components is achieved by overmolding them with plastics in the form of a cage. The winding support preferably also consists of plastics. The plastic overmold in the form of a cage is accordingly also injected to the winding support and preferably encloses the latter over its complete axial length.

It is furthermore advantageous for the stator system to furthermore comprise connecting contacts which are pinned to the winding support, where winding wire taps of the stator system are electrically in contact with the connecting contacts. This embodiment, too, contributes to a simple and inexpensive manufacture of the stator system. Preferably, the winding wire taps are soldered to the connecting contacts or, as an alternative, are contacted by means of resistance welding. The connecting contacts are only partially overmolded and project from the plastic overmold. They preferably extend in the axial direction of the stator system. Still preferably, the winding wire taps are radially bent to the outside, so that the connecting contacts may be placed onto the winding wire taps in the axial direction. To this end, the connecting contacts comprise corresponding receiving slots for the winding wire taps.

The present invention furthermore provides a method of manufacturing the stator system according to the invention. According to the inventive method, the stator winding is first inserted into the external return path. Subsequently, the winding support is placed onto it such that its projections engage in the axially extending recesses at the outer periphery of the external return path. Subsequently, the retaining structure of the stator system made from plastics in the form of a cage is injected to the unit consisting of the external return path and the winding support. The placing of the above-mentioned connecting contacts onto the winding support and the contacting of the winding wire taps are effected before the stator system is overmolded with the plastic cage.

One embodiment of the present invention will be illustrated more in detail below with reference to drawings.

Figure 2:
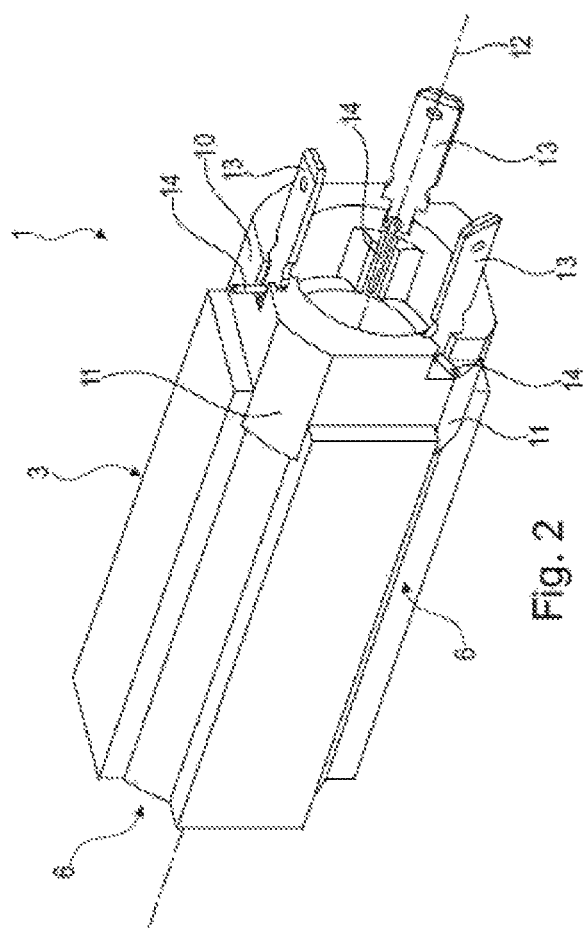
Figure 3:
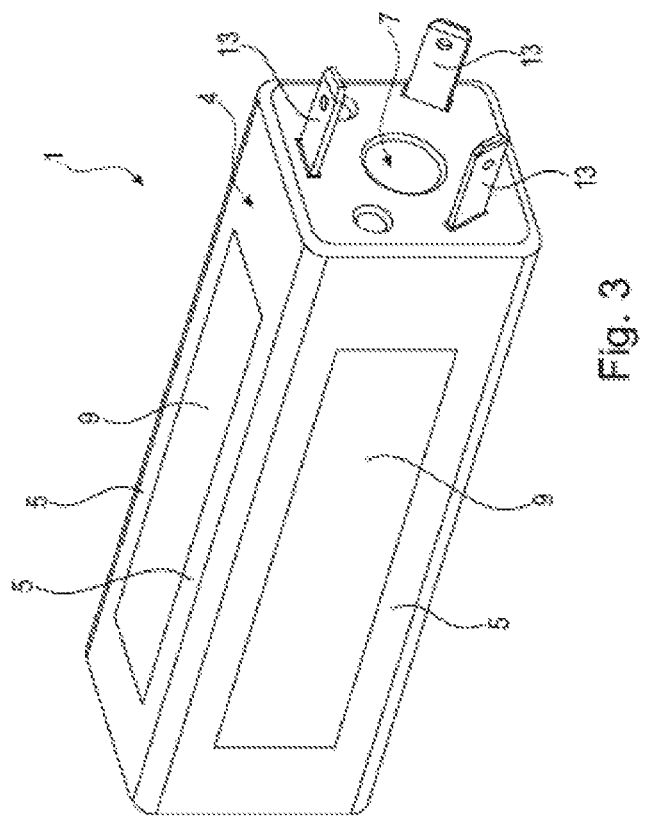

In the drawing:

FIG. 1: shows an exploded view of a stator system according to the invention without retaining structure, FIG. 2: shows the stator system of FIG. 1 in an assembled state, also without retaining structure, FIG. 3: shows the representation of the stator system of FIG. 2 with the retaining structure in the form of a cage injected to the external return path of the stator system, and FIG. 4: shows the stator system of FIG. 3 including the retaining structure from the other side.

In the following illustrations, equal parts are designated by equal reference numerals. If a figure contains reference numerals which are not explicitly discussed in the pertaining description of the figures, reference is made to previous or subsequent descriptions of the figures.

FIGS. 1 to 4 all show one and the same inventive stator system 1 in different representations, wherein the outer retaining structure 4 of the stator system 1 shown in FIGS. 3 and 4 are not represented in FIGS. 1 and 2.

The stator system shown in the exemplified embodiment is the stator system of a small-size high-speed brushless electric motor. The stator system 1 comprises an air-core hollow-cylindrical stator winding 2 which can be best seen in the exploded view of FIG. 1. The air-core hollow-cylindrical stator winding is of a three-phase design in the exemplified embodiment and thus has three phase windings whose winding wire taps 14 are guided to the outside at one axial end of the stator winding. The stator winding is designed such that the rotor of the electric motor is arranged inside the stator winding as a so-called internal rotor. The stator winding 2 is held by a winding support 10 at the axial end where the winding wire taps are guided out. As can be best seen in FIG. 2, three connecting contacts 13 are inserted in the winding support 10, each connecting contact being electrically connected with one of the three winding wire taps 14.

The stator winding 2 is enclosed by an equally hollow external return path 3 to which the winding support 10 is fixed, as will be discussed more in detail below. The external return path 3 consists of a punch-stacked soft-magnetic stack of sheets. Possible embodiments of the stack of sheets are known from prior art and will not be illustrated more in detail here. The external return path 3 has a basically square cross-section. The outer side of the external return path thus comprises altogether four corner regions. As is shown in FIG. 1, in each of the four corner regions, one groove 6 is arranged and extends in parallel to the axis 12 of the external return path or the stator system.

FIGS. 3 and 4 show that the external return path 3 is surrounded by a retaining structure which is injected with plastic to the external return path in the form of a cage 4, so that the external return path is in some regions not covered by the retaining structure but exposed. The exposed regions 9 of the external return path essentially correspond to its four side faces which are each located between two corner regions of the external return path. The cage altogether has four crossbars 5 extending in the axial direction which are injected into the grooves 6 at the outer periphery of the external return path. The four crossbars 5 are fitted in a flush manner in the contour of the outer periphery and are connected to each other both at the front and the rear axial end of the stator system. At both axial ends, the cage 4 forms one bearing receiver 7 or 8 each for the internal rotor of the electric motor. At the axial end where the winding support 10 is arranged, the plastic surrounds the same completely from outside. The winding support 10 is thereby fixed to the external return path 3 of the stator system 1 according to the invention in a particularly stable manner. The plastic which is used for the overmold is preferably polyphthalamide.

Due to the plastic overmold, the stator system according to the invention may be manufactured in a simple and inexpensive way, wherein all components of the stator system are fixed with respect to each other. Compared to conventional solutions with an additional housing sleeve, the plastic overmold includes a distinct weight advantage. Due to the inventive design of the retaining structure as a cage, the heat generated inside the electric motor may be moreover optimally dissipated to the outside. The heat transfer mainly takes place via the exposed regions 9 of the external return path 3.

Below, the method of manufacturing the stator system according to the invention will be illustrated briefly. In a first step, the hollow-cylindrical air-core stator winding 2 is inserted into the external return path 3. In a next step, the winding support 10 is placed onto the stator winding and the external return path 3. The winding support 10 has four projections 11 to this end which engage to some extent in the four grooves 6 at the outer periphery of the external return path when the winding support is being placed onto the external return path. This already results in an effective torque-resistance. The three winding wire taps 14 are then radially bent to the outside through the recesses 15 of the winding support shown in FIG. 1. Subsequently, the three connecting contacts 13 are pinned to the winding support 10 such that in the process, an electric contacting between the winding wire taps 14 and the connecting contacts 13 takes place. To this end, the connecting contacts 13 each have a slot 16 extending in the longitudinal direction into which the corresponding radially bent winding wire tap 14 is clamped. For optimal electric contacting, the winding wire taps are soldered to the connecting contacts.

Now, the components are finally fixed to each other by injecting the plastic cage 4 shown in FIGS. 3 and 4 to the pre-mounted assembly. To this end, the assembly is placed into a corresponding mould and subsequently overmolded with plastics all-around.

In a last step, the exposed regions 9 of the external return path may be additionally lacquered so as to form, together with the plastic overmold, a smooth outer surface of the stator system or the electric motor, respectively. The return path sheets of the external return path are in this manner additionally protected from external influences.

The invention claimed is:

1. Stator system for an electric motor with an internal rotor, wherein the stator system comprises:
   a stator winding, a metal external return path radially enclosing the stator winding, wherein the stator winding is configured as a self-supporting air-core hollow-cylindrical winding and is inserted into the external return path, and wherein the external return path is surrounded by a retaining structure that holds the stator system together, wherein the retaining structure is an injection molded plastic cage formed with respect to the external return path, so that the external return path is not covered by the retaining structure in some regions, but is exposed, and
   a winding support for mounting the stator winding, wherein the winding support is arranged at an axial end of the external return path and includes several projections which are inserted into axially extending recesses at an outer periphery of the external return path, and wherein the cage surrounds a unit consisting of the external return path and the winding support.

2. Stator system according to claim 1, wherein the cage comprises:
   one bearing receiver at each axial end of the stator system for mounting the internal rotor.

3. Stator system according to claim 1, wherein the external return path comprises:
   a punch-stacked soft-magnetic stack of sheets.

4. Stator system according to claim 1, wherein the exposed regions of the external return path are lacquered, so that, together with the cage, a smooth outer surface of the stator system is formed.

5. Stator system according to claim 1, wherein the plastic is polyphthalamide.

6. Stator system according to claim 1, wherein the stator system comprises:
   connecting contacts which are pinned to the winding support, wherein winding wire taps of the stator winding are electrically connected with the connecting contacts.

7. Stator system according to claim 1, wherein the stator system comprises:
   connecting contacts which are pinned to the winding support, wherein winding wire taps of the stator winding are electrically connected with the connecting contacts.

8. Stator system according to claim 1, wherein the cage comprises:
   several crossbars extending in an axial direction of the external return path.

9. Stator system according to claim 8, wherein the crossbars are injected into the axially extending recesses at the outer periphery of the external return path.

10. Stator system according to claim 9, wherein the external return path has a basically rectangular cross-section, the recesses being located in corners of the rectangular cross-section as grooves.

11. Stator system according to claim 9, wherein the crossbars are fitted in a flush manner in a contour of the outer periphery.

12. Stator system according to claim 11, wherein the external return path has a basically rectangular cross-section, the recesses being located in corners of the rectangular cross-section as grooves.

13. Stator system according to claim 12, wherein the cage comprises:
   one bearing receiver at each axial end of the stator system for mounting the internal rotor at each axial of the stator system.

14. Stator system according to claim 13, wherein the external return path comprises:
   a punch-stacked soft-magnetic stack of sheets.

15. Stator system according claim 14, wherein the exposed regions of the external return path are lacquered, so that, together with the cage, a smooth outer surface of the stator system is formed.

16. Stator system according to claim 15, wherein the plastic is polyphthalamide.

* * * * *